United States Patent [19]

Shaw et al.

[11] Patent Number: 4,938,541
[45] Date of Patent: Jul. 3, 1990

[54] REMOTE POWER ASSIST HYDRAULIC ANTILOCK BRAKING SYSTEM

[75] Inventors: Schuyler S. Shaw, Dayton; Donald E. Schenk, Vandalia, both of Ohio

[73] Assignee: General Motors Corporation, Detroit, Mich.

[21] Appl. No.: 352,873

[22] Filed: May 17, 1989

[51] Int. Cl.$^5$ .................. B60T 8/32; B60T 8/48; B60T 13/16

[52] U.S. Cl. .................. 303/10; 303/13; 303/14; 303/116; 303/119; 303/50; 303/114; 188/358

[58] Field of Search .................. 303/10–12, 303/13–15, 116, 119, 92, 113, 9.62, 84.1, 117, 114, 2–3, 6.01, 50, 52, 56; 60/547.1, 545, 548; 188/358, 359

[56] References Cited

U.S. PATENT DOCUMENTS

| | | | |
|---|---|---|---|
| 4,778,226 | 10/1988 | Brown | 303/116 |
| 4,812,777 | 3/1989 | Shirai | 303/14 |
| 4,826,255 | 5/1989 | Volz | 303/10 |

Primary Examiner—Douglas C. Butler
Attorney, Agent, or Firm—Ernest E. Helms

[57] ABSTRACT

A vehicle hydraulic braking system for applying the wheel brakes of an automotive vehicle comprising: a reservoir for holding a hydraulic brake fluid; a pump fluidly connected with the reservoir for pressurizing the fluid; at least one first valve fluidly connected with the pressurized fluid from the pump and the first valve being connected with a modulation sump, the first valve delivering a modulated brake pressure to at least one wheel brake at a ratio of the master cylinder pressure to the wheel pressure so long as the fluid pressure from the pump is above a predetermined value; and a second valve fluidly connected with the wheel brake, the master cylinder, the modulated brake pressure, and with the pump and, whereby the second valve isolates the master cylinder from the wheel brake when the pump pressure is above a predetermined value delivering modulated pressure to the wheel brake and when the pump pressure is below a predetermined value the second valve connects the master cylinder with the wheel brake.

9 Claims, 2 Drawing Sheets

REMOTE POWER ASSIST HYDRAULIC ANTILOCK BRAKING SYSTEM

FIELD OF THE PRESENT INVENTION

The field of the present invention is that of automotive braking system apparatuses and methods of utilization thereof. More particularly, the field of the present invention involves anti-lock braking system (ABS) for automotive vehicles, particularly luxury two-seater type vehicles.

DISCLOSURE STATEMENT

In luxury two-seater sport-type vehicles space within the vehicle can often be at a premium. Therefore, to delete the requirement of having adjustable seats, the dashboard and brake pedals are adjustably movable. When utilizing a brake pedal which is locationally adjustable, it is often undesirable and/or impossible to place the master cylinder on the fire wall of the vehicle between the passenger compartment and the engine compartment.

SUMMARY OF THE INVENTION

The present invention provides a vehicle braking system which can be readily used in vehicles which utilize a remote master cylinder. In its preferred embodiment, the present invention provides a braking system with a locationally adjustable master cylinder which allows unlimited displacement upon apply and also provides for a full manual back-up in case of a hydraulic pump failure. Additionally, the present invention provides a brake system which can be placed into an ABS mode and which can orifice the ABS apply cycle without providing any restriction for normal brake supply to the wheel brake cylinder.

It is an object of the present invention to provide an apparatus and method of utilization thereof of a vehicle braking system.

Other objects, and advantages of the present invention, can become more apparent to those skilled in the art as the nature of the invention is better understood from the accompanying drawings and a detailed description.

DETAILED DESCRIPTION OF THE DRAWINGS

Figure 1:
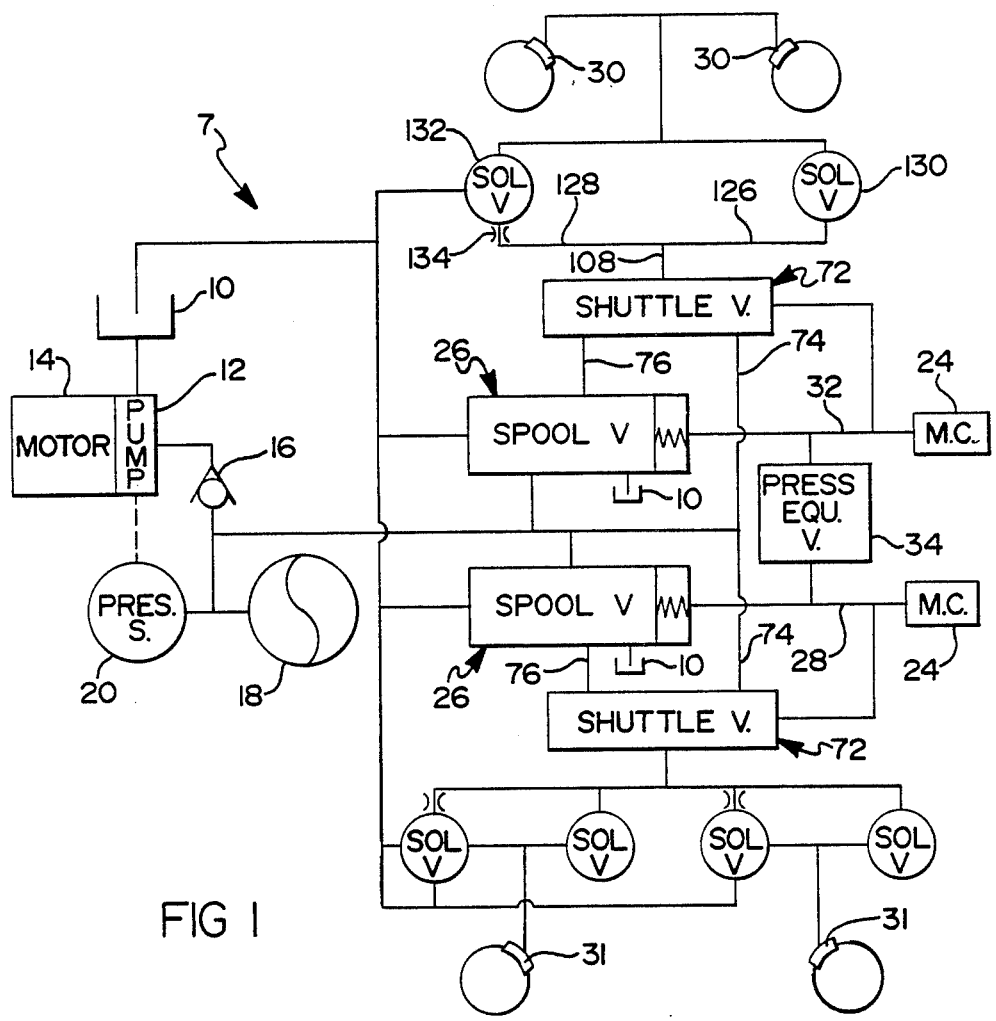
FIG. 1 is a schematic of a preferred embodiment braking system according to the present invention.

The brake system 7 has a reservoir means 10 for holding hydraulic fluid. Connected with the reservoir means is a hydraulic pump 12 powered by a motor 14. The hydraulic pump 12 supplies pressurized braking fluid through a check valve 16 to an accumulator 18. A pressure switch 20 connected with the brakeline downstream of the check valve 16 automatically turns on the pump 12 to resupply pressurized fluid to the system 7 whenever the pressure is below a second predetermined value. The pump 12 supply pressure will be used to actuate the wheel brakes (cylinders) in an ABS mode of operation and during normal brake apply.

Connected with the pressurized fluid from a master cylinder 24 is a first valve means or spool valve 26. There will be at least one spool valve 26 and preferably at least two spool valves in the brake system 7. Lines 28 and 32 of the dual circuit master cylinder 24 are each connected with a separate spool valve 26. Connecting the circuit lines 28 and 32 is a pressure equalization valve 34.

Figure 3:
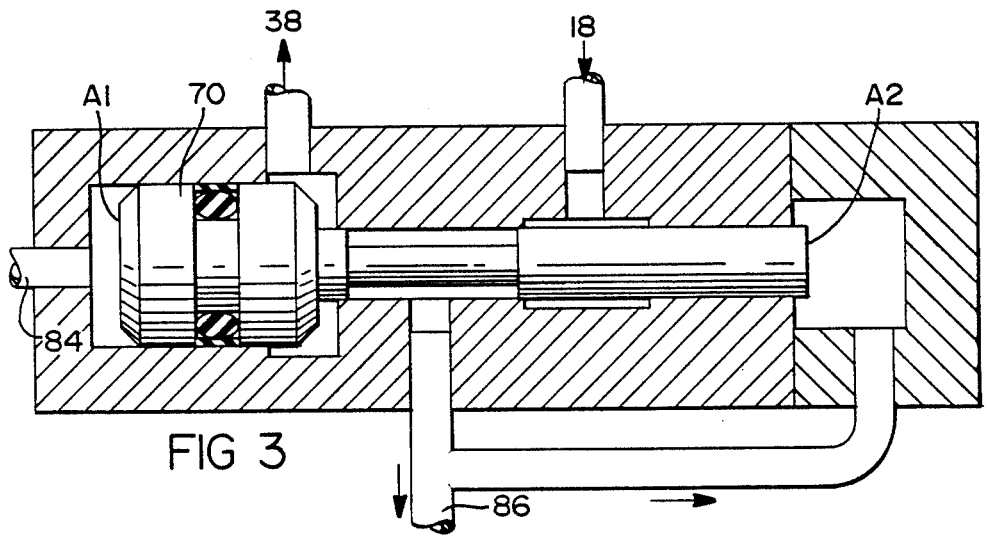
FIG. 3 is a schematic view illustrating operation of the shuttle valve.
Figure 2:
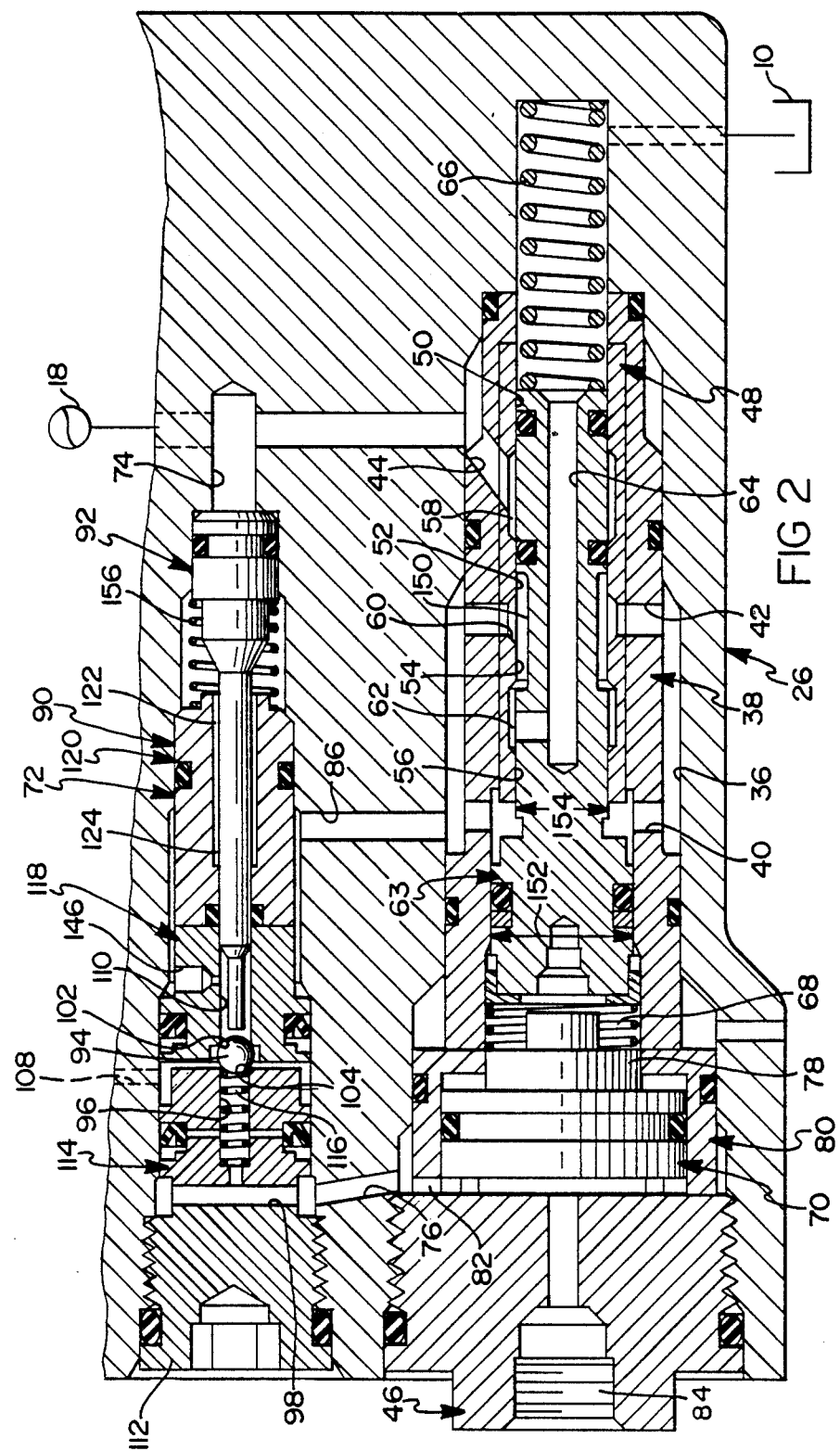
FIG. 2 is a sectional view of the spool valve and the shuttle valve shown in the schematic view of FIG. 1.

Referring additionally to FIGS. 2 and 3, the spool valve 26 has an elongated multidiametered central bore 36. The central bore 36 at one extreme end is open to a modulation sump which is typically often the reservoir 10 which supplies the pump 12. Sealably mounted within the bore 36 is an outer housing 38. The housing 38 has three radial passages 40, 42 and 44. On the opposite end of the central bore away from the sump 10, the spool valve 26 is connected to the master cylinder 24 via an outer plug 46. Within the outer housing 38 is an inner housing 48 with a series of landings 50, 52, 54 and 56 and valleys 58, 60 and 62. Slidably mounted within the inner housing is a spool 63. The spool 63 has an inner passage 64 connecting the outer diameter of the spool with the sump 10.

The spool is spring biased toward the master cylinder 24 by a first spring 66. Biasing the spool away from the master cylinder 24 is a second spring 68 (commonly referred to as the pedal travel displacement spring). Between the second spring 68 and the plug 46 which provides the connection with the master cylinder 24 is a master cylinder fluid pressure actuated piston 70. (Note, this should not be confused with the piston within the master cylinder 24 which is not shown). The master cylinder piston 70 compresses the second spring 68 against the spool 63 via a pin section 78 when there is pressure within the master cylinder 24. Second spring 68 can be changed to establish a different pedal feel. Captured between the outer housing 38 and the plug 46 is the master cylinder piston housing 80 which mounts the piston 70. The piston housing 80 has radial passage 82 which connects with the master cylinder 24 to inlet 84.

If the master cylinder 24 is in a remote location; that is, the master cylinder provides pressurized fluid to act upon the master cylinder piston 70. However, the plug 46 could be removed and the rod, not shown, from a vehicle brake pedal could be directly connected to another piston slidably sealably mounted within the central bore 36 to the left of the piston 70, master cylinder piston 70 providing a directly connected master cylinder.

Pressurized fluid from the pump 12 or, as in the embodiment shown, the pump via the accumulator 18, passes through the inner and outer housing of the spool valve. Associated with each spool valve 26 is a shuttle valve 72. The shuttle valve may be remotely located from the spool valve 26 or may be located in the same housing as shown in FIG. 2. The shuttle valve has a first fluid connection 74 with the accumulator 18 as well as a second fluid connection 76 with the master cylinder via the spool valve 26. Fluid connection 76 communicates with passage 82. Additionally, the shuttle valve has a third fluid connection 86 with the spool valve 26 for receiving therefrom modulated brake pressure as will later be described.

The shuttle valve 72 has a multiple piece housing 90 with a slidably mounted isolation-type valve 92. The isolation valve 92 impacts upon a ball 94 which is spring biased within a passage 96. Passage 96 fluidly connects with the inlet 84 of the spool valve 26 with the master cylinder 24 via passages 82, 76 and 98. The ball 94 can alternatively be urged onto a seat 104 which is toward the passage 96 or unto a seat 102 toward a passage 110. The location of the ball 94 determines where the shuttle valve's fluid connection 108 with the wheel brake 30 is in fluid communication with the master cylinder 24 or the modulated pressure from the spool valve 26 therewith. The isolation valve 92 is biased on its extreme end by fluid pressure beyond a predetermined level, the isolation valve 92 will be shifted toward the left placing the ball on the left-hand seat 104 against the biasing action of a spring 116, isolating the master cylinder 24 from the wheel brake 30 cylinder during normal periods of brake operation. The shuttle valve 72 has at its left end a plug 112. A first housing piece 114 which provides the passages 98 and 96 for the master cylinder 24 fluid communication to the wheel brake (via line 108). A second housing piece 118 allowing modulated brake pressure from the spool valve 26 to travel to the wheel brake via passage 110, and a third housing piece 120 member which seals one of the outer diameters 124 of the isolation valve 92.

Between the shuttle valve 72 and outlet line 108 and the wheel brakes 30 are two branch connections brakes The second branch 126 connection is through a normally open solenoid valve 130 which is utilized for normal braking operating. The first branch 128 is through a three-position solenoid valve 132 which is which is controlled by an ABS controller (not shown). The ABS solenoid valve 132 is a three-position valve, allowing flow between the shuttle valve 72 and the wheel brake 30 in one position, isolating the wheel brake 30 from the shuttle valve 72 in the second position or connecting the wheel brake 30 with a sump typically to the reservoir 10 in the third position. Upstream of the solenoid valve 132 is an orifice 134. The orifice 134 is utilized to control flow going to the wheel brake 30 on an ABS reapply cycle. Since solenoid valves 130 and 132 are open during normal brake operation, the orifice 134 will not affect brake apply and/or release operation.

Only one shuttle valve 72 need be utilized with each spool valve 26. However, one shuttle valve 72 may supply left and right front wheel brakes 31 each having independent ABS control or it may supply two rear wheel brakes 30 wherein the rear wheel brakes 30 are joined together to provide ABS operation in unison, as is often the case in ABS systems, especially those utilizing rear wheel drive powertrains.

In operation the isolation valve 92 is moved leftward (from the position shown in FIG. 2) by accumulator pressure to urge ball 92 against the seat 104. Pressurized fluid enters through the master cylinder inlet 84 of the spool valve 26, pushing the master cylinder piston 70 to compress the pedal displacement (or second) spring 68. The above movement causes the spool 63 to move to the right (from the position shown in FIG. 2), connecting a valley 150 of the spool 63 with the valley 58 of the inner housing, which is connected with the accumulator pressure. Therefore, accumulator pressure now comes to the valley 150 of the spool 63 and exits the modulated pressure outlet or third passage 86. The modulator pressure outlet 86 connects with the outer diameter of the third housing piece 120 of the shuttle valve 72, then goes radially inward through passage 146 past a reduced diameter portion of the spool 92 and out to the wheel brake via line 108.

Referring additionally to FIG. 3, a force balance occurs wherein the modulated pressure will always be a ratio of the master cylinder pressure whenever the accumulator pressure is above a certain predetermined value. In typical operation, accumulator pressure will be 2200 PSI. Modulated pressure will be in the neighborhood of 1200 PSI max. and master cylinder pressure will be 300 PSI max. If master cylinder pressure should increase, the spool 63 will move further rightward, allowing more accumulator pressure to enter the modulated pressure outlet 86. Upon brake release, master cylinder pressure will reduce, allowing the first spring 66 to urge the spool 63 to the left (back to the position shown in FIG. 2), therefor connecting the inner passage 64 of the spool 63 with the modulated pressure, allowing the brake pressure to now enter into the sump 10. A pressure balance is established having a relationship of the pressure of the wheel brake multiplied area A2 or reaction area of the spool 63 (equal to the area of O.D. 152 minus the area of O.D. 154) will always equal master cylinder pressure multiplied (A1), which is provided by the master cylinder piston 70. Since the master cylinder piston area is much greater than the area A1, a force multiplication effect occurs.

The ball 94 will be maintained against the seat 104 by the isolation valve 92. (Note, the isolation valve 92 is biased to the right by a spring 156). However, the biasing force of the spring 156 is overcome by the pressure from the accumulator. Therefore, the master cylinder 24 is isolated from the wheel brake 30. Therein comes the term "false master cylinder". However, if there should be a system failure (pump or line breakage), the spring 156 will force the isolation 90 valve to the right and master cylinder pressure can be connected with the wheel brake 30. The slight spring 116 will hold the ball 94 against the opposite seat 102 to allow release from the wheel brake 30 back to the master cylinder 24 in the system failure mode of operation.

As previously mentioned, if an ABS operation is mandated by the system controller (not shown), the solenoid valve 130 will close and the solenoid valve 132 will connect the wheel brake 30 with the reservoir 10, relieving pressure to the wheel brake 30. When pressure reapply is required, the solenoid valve 132 will connect the wheel brake 30 with the shuttle valve 26, allowing orificed pressure reapply to the wheel brake 30.

The pressure differential valve 34 is provided between the master cylinder circuits to alert the vehicle operator if a failure has occurred in one of the dual circuits 32,28 of the master cylinder 24.

An advantage of the present system is that the master cylinder 24 can be located remote from the fire wall of the vehicle, since the master cylinder 24 in the remote location only supplies the pressurized fluid to the piston 70. The shuttle valve 72 can be typically located near the wheel housings of the respective wheels. Additionally, the present invention provides unlimited full brake apply, full dual channel ABS operation, and a manual back-up braking system whenever the pump 12 fails to operate.

While an embodiment of the present invention has been explained, it will be readily apparent to those skilled in the art of the various modifications which can be made to the present invention without departing from the spirit and scope of this application as it is encompassed by the following claims.

We claim:

1. A vehicle hydraulic braking system for applying the wheel brakes of an automotive vehicle comprising:
   a reservoir means for holding a hydraulic brake fluid;
   pump means fluidly connected with said reservoir for pressurizing said fluid;
   at least one first valve means fluidly connected with said pressurized fluid from said pump means and said first valve means being connected with a modulation sump, said first valve means delivering a modulated brake pressure to at least one said wheel brake at a ratio of said master cylinder pressure to said wheel pressure so long as the fluid pressure from said pump is above a predetermined value; and
   a second valve means fluidly connected with said wheel brake, said master cylinder, said modulated brake pressure, and with said pump and, whereby said second valve means isolates said master cylinder from said wheel brake when said pump pressure is above a predetermined value delivering modulated pressure to said wheel brake and when said pump pressure is below a predetermined value said second valve mean connects said master cylinder with said wheel brake.

2. A vehicle braking system as described in claim 1 wherein said pump means further includes a check valve allowing flow from said pump toward said first valve means and an accumulator with a pressure switch turning on said pump whenever the pressure delivered by said pump to said spool valve goes below a second predetermined value.

3. A vehicle braking system as described in claim 1 wherein said master cylinder is in a location remote from said first valve means.

4. A vehicle braking system as described in claim 1 having a dual circuit master cylinder and each said master cylinder circuit having an individual first and second valve means associated therewith for applying a plurality of wheel brakes.

5. A vehicle braking system as described in claim 1 having a three-way solenoid valve between said second valve means and said wheel brake said three-way valve being controlled by an anti-lock braking system controller and also being connected with a reservoir for providing ABS operation to said wheel brake.

6. A vehicle braking system as described in claim 5 wherein said second valve means has two branch connections with said wheel cylinder controlled by two solenoid valves, said first branch having a first solenoid valve being a three-way valve with a connection to a reservoir and also having an orificed inlet for providing orifice brake apply to said wheel brake when said wheel is in the ABS mode of operation, and said second branch having a solenoid valve normally open providing unrestricted apply during normal braking operation and being closed in the ABS mode.

7. A vehicle anti-lock hydraulic braking system for applying the wheel brakes of a vehicle comprising:
   a reservoir means for holding a hydraulic brake fluid;
   pump means connected with said reservoir for pressurizing said fluid;
   two spool valve fluidly connected with said pressurized fluid from said pump and with a modulation sump, said first valve means delivering the modulated brake pressure to each of said wheel cylinders at a ratio of said master cylinder pressure to said wheel pressure so long as the fluid pressure from said pump is above a predetermined value; and
   a shuttle valve associated with each one of said spool valves fluidly connected with said wheel brake and being fluidly connected with said master cylinder via said spool valve and said shuttle valve being fluidly connected with said modulated brake pressure and said shuttle valve being fluidly connected with said pump and whereby said shuttle valve isolates said master cylinder from said wheel cylinder when said pump pressure is above a predetermined value delivering modulated pressure to said respective wheel cylinder and when said pump pressure is below a predetermined value said shuttle valve connects said master cylinder with said wheel brake;
   a first three-way solenoid valve connected with said wheel brake, said shuttle valve, and a reservoir to provide for ABS operation of said wheel cylinder; and
   a second solenoid normally open solenoid valve allowing flow between said shuttle valve and said wheel cylinder, said second solenoid valve being closed during ABS operation of said wheel cylinder.

8. A method of applying the wheel brakes of a vehicle hydraulic braking system, said method comprising:
   holding the hydraulic brake fluid in a reservoir;
   pumping said fluid from said reservoir;
   supplying a fluid pressure from a master cylinder;
   modulating said fluid from said pump in response to the pressure from said master cylinder;
   supplying said modulated pressure to said wheel cylinder while isolating said master cylinder from said wheel cylinder; and
   connecting said master cylinder with said wheel cylinder in an absence of a predetermined pressure from said pump.

9. A method as described in claim 8 further including supplying said modulated pressure to said wheel cylinder or alternatively, holding the pressure within said wheel cylinder or, alternatively, connecting said wheel cylinder with a reservoir to provide anti-lock operation of said wheel cylinder by a solenoid connected with a reservoir, said wheel and said modulated pressure.

* * * * *